(12) United States Patent
Ou et al.

(10) Patent No.: US 7,662,434 B2
(45) Date of Patent: *Feb. 16, 2010

(54) PROCESS FOR PREPARING A METAL STYRENE POLYMER COMPOSITE HAVING NANO METALLIC PARTICLES DEPOSITED THEREON

(75) Inventors: Jinn-Luh Ou, Taipei (TW); Chang-Ping Chang, Taoyuan (TW); Yuh Sung, Taoyuan (TW); Ming-Der Ger, Taoyuan (TW); Chun-Chieh Tseng, Taoyuan (TW); Wen-Ding Chen, Taoyuan (TW)

(73) Assignee: Chung Cheng Institute of Technology, National Defense University, Taoyuan (TW)

( * ) Notice: Subject to any disclaimer, the term of this patent is extended or adjusted under 35 U.S.C. 154(b) by 426 days.

This patent is subject to a terminal disclaimer.

(21) Appl. No.: 11/497,308

(22) Filed: Aug. 2, 2006

(65) Prior Publication Data
US 2010/0015338 A1    Jan. 21, 2010

(51) Int. Cl.
*B05D 7/00*    (2006.01)
(52) U.S. Cl. .................................... 427/212; 427/222

(58) Field of Classification Search ................ 427/212, 427/222
See application file for complete search history.

(56) References Cited

U.S. PATENT DOCUMENTS

| 5,859,112 | A * | 1/1999 | Overbeek et al. | 524/460 |
| 6,787,233 | B1 * | 9/2004 | Molteberg et al. | 428/403 |
| 7,282,531 | B2 * | 10/2007 | Miyai et al. | 524/556 |
| 2006/0228550 | A1 * | 10/2006 | Ou et al. | 428/402 |

* cited by examiner

*Primary Examiner*—Michael Cleveland
*Assistant Examiner*—Robert Vetere
(74) *Attorney, Agent, or Firm*—Bacon & Thomas, PLLC

(57) ABSTRACT

A process for preparing a metal styrene polymer composite having nano metallic particles deposited thereon is disclosed, which includes a) undergoing free radical polymerization of styrene and an optional co-monomer in the presence of a persulfate initiator and a chain transfer agent; and b) contacting the resulting styrene oligomer or copolymer of styrene and the co-monomer from step a) with an aqueous solution containing a noble metal ion dissolved therein, so that the noble metal ion is reduced to element form particles and deposit on the styrene oligomer or copolymer of styrene and the co-monomer by sulfates on the oligomer or copolymer in the absence of a reducing agent.

13 Claims, 4 Drawing Sheets

PROCESS FOR PREPARING A METAL STYRENE POLYMER COMPOSITE HAVING NANO METALLIC PARTICLES DEPOSITED THEREON

FIELD OF THE INVENTION

The present invention is related to a process for preparing a metal styrene polymer composite, and particularly to a process for preparing a metal styrene oligomer composite with metallic nano particles deposited on the surface thereof.

BACKGROUND OF THE INVENTION

Nano composites involve many aspects of technology and have a wide variety of production processes available. In brief, the processes for producing nano composite can be classified into four groups: directly mixing metallic nano particles with polymer(s); forming metallic nano particles in a polymer matrix; polymerizing a polymer from monomer(s) in the presence of metallic nano particles; simultaneously forming metallic nano particles and a polymer. In the processes for preparing nano composite, the most crucial issue involves an effective control on the dimensions of the metallic nano particles per se in order to ensure that at least one dimension of a composition phase in the composite is within the range of a nano dimension, and then care is taken to control the aggregation of nano particles. In general, a surfactant, a metal salt, and a reducing agent are used in a chemical reduction process for producing nano particles. The types of applicable reducing agents include: hydrazine, sodium borohydride, hydrogen, etc. A typical chemical reduction process for producing nano particles comprises dissolving a surfactant in a liquid phase; adding and mixing metal ions in the liquid phase; and adding a reducing agent into the resulting mixture to reduce the metal ions into nano particles.

U.S. Pat. No. 6,855,749 discloses a nano-structured composite, which is prepared by blending a nanoscale filler with a matrix. Said nanoscale filler can be Ba, Bi, Cs, etc. Said matrix can be poly(acrylic acid), PAA. The method disclosed in this patent has a difficulty in uniformly distributing the nanoscale filler in the matrix, and is unable to adhere most metallic nano particles on the surface of the matrix.

U.S. Pat. Nos. 5,115,036 and 5,064,879 use a copolymer with a molecular weight of 5,000~50,000, which is copolymerized from ethylene and aminoalkyl acrylate, and is modified to have different terminal functional groups with different electronegativities to chelate different metal ions. However, after chelation of the metal ions, the metal ions are liable to separate from a polymer matrix.

S. Hahakura, Journal of Crystal Growth, Vol. 237, pp. 1942-1945, 2002, discloses a process, which comprises dissolving a surfactant SDS (sodium dodecyl sulfate) in an aqueous solution to form micelles; using such a micelle structure as a template and introducing platinum ions into the micelles; and introducing hydrogen to reduce platinum ions into nano particles.

Kazutaka Hayakawa, Langmuir, Vol. 19, pp. 5517-5521, 2003, discloses a process, which comprises using a dendrimer as a matrix; dissolving $HAuCl_4$ into a polymer emulsion; and using laser to reduce metal ions into nano particles. The dendrimer has a dispersion effect during the process of reducing metal ions into metallic nano particles. The formation of dendrimer also has an absolute effect on the particle size and the dispersion of the nano particles. Meanwhile, the dendrimer can be used to control the size and dispersion of the nano particles formed.

SUMMARY OF THE INVENTION

A primary objective of the present invention is to provide a simple process for preparing a metal polymer composite with metallic nano particles deposited on the surface thereof. More specifically, the objective of the present invention is to provide a process for preparing a metal styrene polymer composite with metallic nano particles deposited on the surface thereof, wherein said styrene polymer can be a styrene oligomer or a copolymer of styrene and a hydrophilic monomer. Furthermore, said styrene oligomer can be further grafted with hydrophilic groups in order to improve the hydrophilic property of the metal styrene oligomer composite with metallic nano particles deposited on the surface thereof.

A process according to the invention comprises polymerizing styrene monomer and, optionally, a hydrophilic monomer in the presence of a persulfate initiator and a chain transfer agent by free radical polymerization; contacting the resulting styrene oligomer or copolymer with a solution containing metallic ions at an elevated temperature, thereby forming by reduction metallic nano particles on the surface of the styrene oligomer or copolymer. The persulfate initiator used in the process of the present invention has reducing power under high temperature. As a result, metal ions can be reduced into elemental metal without the use of a reducing agent. Furthermore, the use of the chain transfer agent enables the styrene monomer to form an oligomer with a low molecular weight during the free radical polymerization, thereby rendering a reduced hydrophobic property of the resulting composite.

Optionally, the invented process further comprises modifying said composite to improve the hydrophilic property thereof. For example, a sulfonate group is grafted onto the para-position of the styrene oligomer.

DETAILED DESCRIPTION OF THE INVENTION

Figure 1:
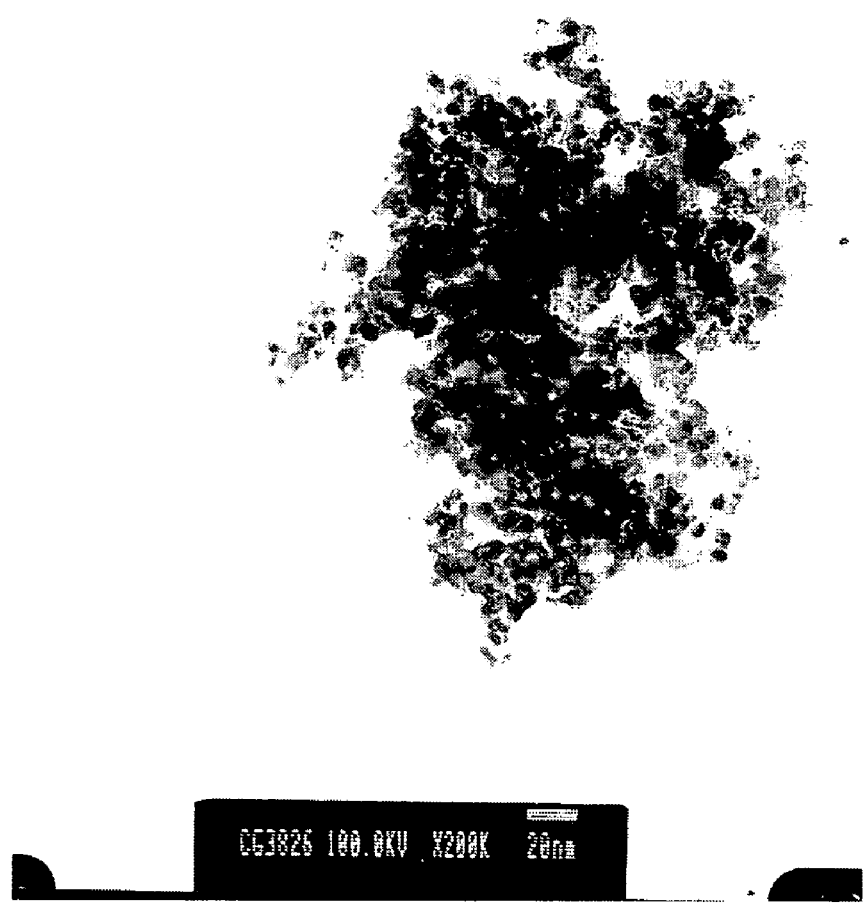
FIG. 1 shows a transmission electron microscopic (TEM) photo of the styrene oligomer composite with nano Pd particles deposited on the surface thereof, as prepared in Example 2 of the present invention.

Preferred embodiments of the present invention include (but not limited to) the following items:

1. A process for preparing a metal styrene polymer composite having nano metallic particles deposited on a surface thereof, which comprises the following steps:
    a) undergoing free radical polymerization of styrene and an optional co-monomer in the presence of a persulfate initiator and a chain transfer agent; and b) contacting the resulting styrene oligomer or copolymer of styrene and the co-monomer from step a) with an aqueous solution containing noble metal ions dissolved therein, so that the noble metal ions are reduced to element form particles and deposit on the styrene oligomer or copolymer of styrene and the co-monomer by sulfates on the oligomer or copolymer in the absence of a reducing agent.

2. The process of Item 1, wherein said persulfate initiator is alkali metal persulfate.
3. The process of Item 2, wherein said alkali metal persulfate is potassium persulfate.
4. The process of Item 1, wherein said chain transfer agent is tetrahalocarbon, 1-dodecyl sulfuric acid, 1-octyl sulfuric acid, or hydroquinone.
5. The process of Item 4, wherein said chain transfer agent is tetrahalocarbon.
6. The process of Item 5, wherein said tetrahalocarbon is tetrabromocarbon.
7. The process of Item 1, wherein said optional co-monomer is not used in Step a).
8. The process of Item 7, wherein the styrene oligomer obtained in Step a) has a number average molecular weight of 500-10,000.
9. The process of Item 1, wherein said aqueous solution containing noble metal ions in Step b) is an aqueous solution containing Au, Ag, Pd, Pt or Ru.
10. The process of Item 9, wherein said aqueous solution containing noble metal ions is an aqueous solution containing Pd ions.
11. The process of Item 1, wherein said contacting in Step b) is carried out at a temperature of 50-95° C.
12. The process of Item 1, wherein said optional co-monomer is used in Step a).
13. The process of in Item 12, wherein said co-monomer is selected from the group consisting of acrylic acid, methacrylic acid, methyl acrylate, and methyl methacrylate.

Free radical polymerization of styrene monomer is a technique well known in the industry and comprises selection of an initiator, a chain transfer agent, a solvent, etc. to control the molecular weight and particle size of the resulting polymer. This has been well documented in the literature. The characteristics of the invention do not include free radical polymerization of styrene monomer or modification for improving the hydrophilic property of the resulting polymer, but involves the use of a specific initiator so that the resulting styrene oligomer or copolymer has a reducing power to noble metal ions. Thus, under the situation free from a reducing agent, noble metal ions can be reduced and deposited on the surface of the styrene oligomer or copolymer to form nano noble metal particles. An initiator suitable for use in the process of the present invention is persulfate. Another feature of the invention includes the use of a chain transfer agent to control the molecular weight of the styrene polymer so that the final metal styrene polymer composite with nano metallic particles deposited on the surface thereof has a higher dispersion power in solution and a higher adhesive force to a to-be-coated substrate.

The present invention can be better understood through the following examples, which are for illustrative purpose only, and not for limiting the scope of the present invention.

Example 1

Preparation of Styrene Oligomer 1 g, 3 g and 5 g of tetrabromomethane were separately dissolved in 30 ml of styrene monomer. 6 ml of the resulting styrene solutions were separately mixed with 54 ml of $3 \times 10^{-}M$ potassium persulfate aqueous solution. The resulting mixtures were placed in an oil bath at 75° C. for 8 hours, thereby obtaining three styrene oligomers each with a different molecular weight. The reactions taking place in the solution cab be expressed by the following formula:

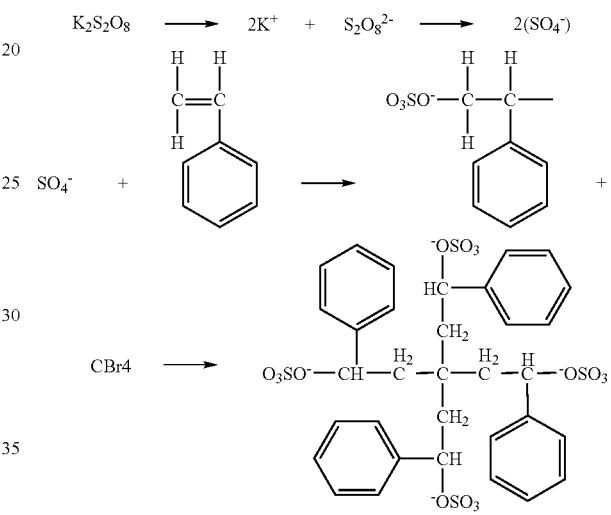

Table 1 lists the number average molecular weight (Mn) and the weight average molecular weight (Mw) of the styrene oligomers obtained in this example, measured by a gel permeation chromatography (GPC), and the ratio thereof.

TABLE 1

| Oligomer | CBr$_4$/styrene | Mn | Mw | Mw/Mn |
|---|---|---|---|---|
| 1 | 5.0 g/30 ml | 1310 | 2880 | 2.19 |
| 2 | 3.0 g/30 ml | 2020 | 5900 | 2.92 |
| 3 | 1.0 g/30 ml | 9330 | 25600 | 2.74 |

Example 2

Preparation of Styrene Oligomer with Nano Metallic Particles Deposited on the Surface Thereof 0.5 g of the styrene oligomer with a number average molecular weight of 1310 prepared in Example 1 was added into 100 ml of deionized water. Next, water was heated to and maintained at 80° C. The noble metal solutions listed in Table 2 were separately added into the mixtures of styrene oligomer/deionized water to be reacted for 5 minutes, wherein the concentrations of the noble metal ions in the resulting reaction mixtures were also listed in Table 2. After the reaction, the styrene oligomers were separated by filtration and washed with deionized water, and then dried at an elevated temperature to obtain metal styrene oligomer composites with nano metallic particles deposited on the surface thereof.

TABLE 2

| | |
|---|---|
| $PdCl_2$ | 800 ppm |
| $AgNO_3$ | 10000 ppm |
| $HAuCl_4$ | 10000 ppm |
| $H_2PtCl_6$ | 10000 ppm |

FIG. 1 shows a Pd styrene oligomer composite with nano Pd particles deposited on the surface thereof, as prepared according to this example.

Example 3

Preparation of Styrene Oligomer Containing Sodium Sulfate Group 5 g of styrene oligomer with a number average molecular weight of 1310 prepared in Example 1 was dissolved in 20 ml of cyclohexane. The resulting mixture was agitated for a period of time until the styrene oligomer was completely dissolved. Next, the mixture was added with 6 ml of concentrated sulfuric acid and heated to 80° C. for reaction for 3 hours. Upon completion of the reaction, the mixture was added with 5 M NaOH aqueous solution until the pH value of the resulting mixture reached 8. Next, the resulting solid portion was removed and placed in a container separated by a dialysis membrane, and a dialysis treatment was carried out to remove residual sodium ions and sulfate ions from the solid portion, thereby obtaining a product.

Figure 2:
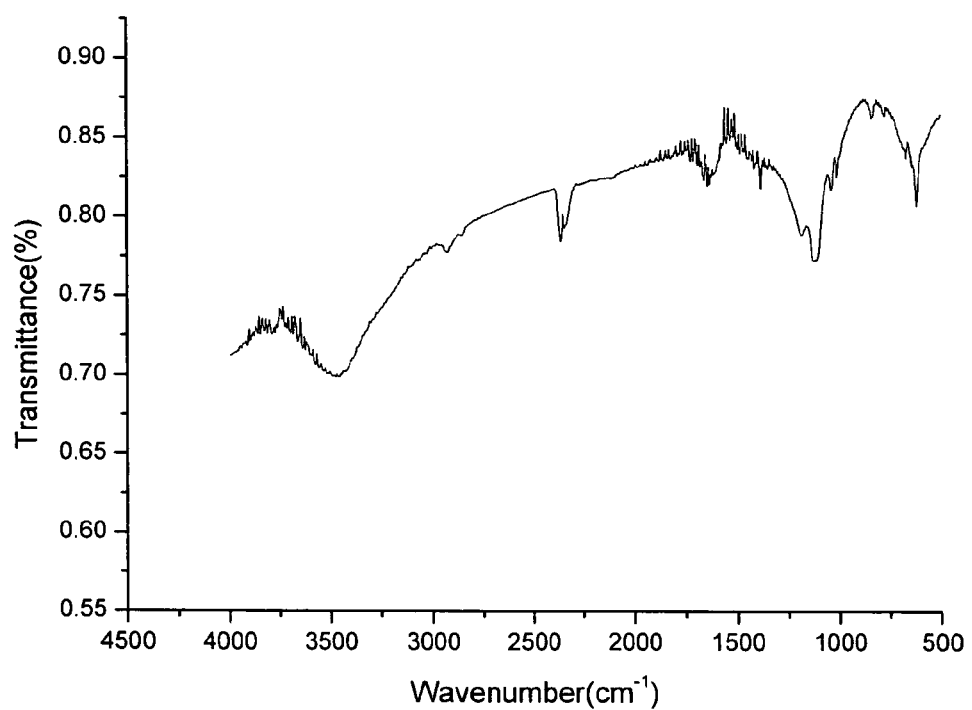
FIG. 2 shows a Fourier Transform Infrared Rays Spectrometer (FT-IR) spectrum of the styrene oligomer containing sodium sulfonate group, as prepared in Example 3 of the present invention.

The FT-IT spectrum of the product after purified by the dialysis treatment is shown in FIG. 2. The spectrum clearly shows an absorption peak at 1175 cm$^{-1}$ which is caused by a symmetric stretching vibration of sulfonate groups. Furthermore, the absorption peak at 839 cm$^{-1}$ is caused by variation of the degree of sulfonation in the fingerprint region. The existence of this absorption peak indicates that the sulfonic acid group is located at the para-position of the benzene ring of the styrene oligomer.

Example 4

Figure 3:
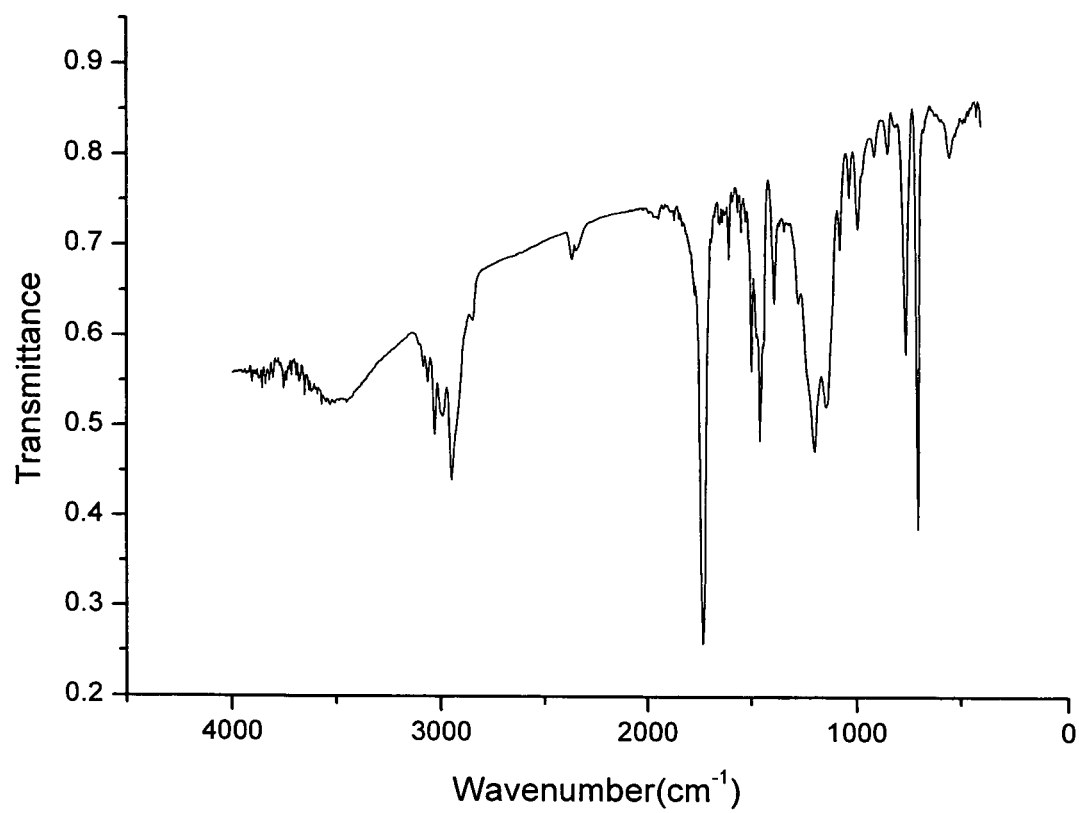
FIG. 3 shows a FT-IR spectrum of the styrene-A copolymer, as prepared in Example 4 of the present invention.

Preparation of Styrene-NMA (Methyl Methacrylate) Copolymer 1 g of tetrabromomethane was dissolved in 30 ml of a mixture of styrene monomer (SM) and methyl metharylate (MMA) monomer (molar ratio of SM:MMA=2:3). 6 ml of the monomer mixture with tetrabromomethane dissolved therein was mixed with 70 ml of $3\times10^{-3}$M potassium persulfate aqueous solution (KPS). The resulting mixture was placed in an oil bath at 75° C. for reaction for 8 hours to obtain a copolymer of styrene-MMA. A FT-IT spectrum of the resulting styrene-MMA copolymer is shown in FIG. 3.

Example 5

Preparation of Styrene Oligomer, Copolymer of Styrene-MMA, and MMA Oligomer

The steps in Example 4 were repeated except that the amounts of reactants and the temperature were changed as listed in Table 3 to prepare styrene oligomer, styrene-MMA copolymers and MMA oligomer. The Mn, and Mn/Mw of the resulting polymers, and conversion ratio of the monomers are listed in Table 3.

TABLE 3

| Initiator | | | | | | | Conversion ratio | | |
|---|---|---|---|---|---|---|---|---|---|
| SM (ml) | MMA (ml) | (KPS) (M) | Temp. (° C.) | $CBr_4$ (g) | Mn (GPC) | Mn/Mw | Total (wt %) | SM (mole %) | MMA (mole %) |
| 0 | 6 | 0.0111 | 70° C. | 1 (g) | 1290 | 3.47 | 86.7 | — | — |
| 1 | 5 | | | | 1015 | 3.22 | 77.2 | 17.9 | 82.1 |
| 2 | 4 | | | | 685 | 2.33 | 73.1 | 39.1 | 60.9 |
| 3 | 3 | | | | 695 | 2.18 | 71.9 | 45.7 | 54.3 |
| 4 | 2 | | | | 767 | 2.11 | 75.1 | 52.1 | 47.9 |
| 5 | 1 | | | | 752 | 2.03 | 31.4 | 73.8 | 26.2 |
| 6 | 0 | | | | 749 | 1.83 | 49.7 | — | — |

Example 6

Preparation of Styrene Oligomer Containing Sodium Sulfonate and with Nano Metal Particles Deposited on the Surface Thereof 3 g of styrene oligomer containing sodium sulfonate prepared in Example 3 was added into 100 ml of deionized water. Next, the mixture was heated to and maintained at 80° C. An aqueous $PdCl_2$ solution was added into the mixture of styrene oligomer/deionized water for reaction for 5 minutes, wherein the concentration of $PdCl_2$ in the reaction mixture was 800 ppm. After the reaction, the styrene oligomer was recovered by filtration and washed with deionized water, and then dried at an elevated temperature to obtain a styrene oligomer composite with nano metallic particles deposited on the surface thereof.

Figure 4:
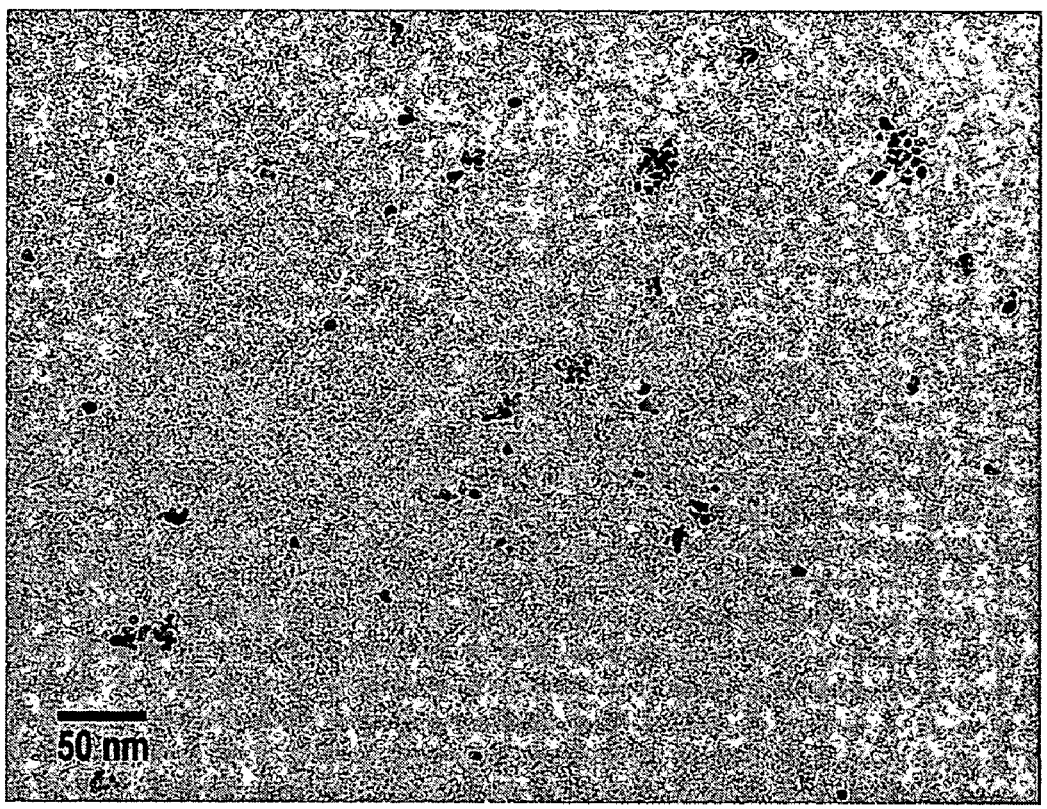
FIG. 4 shows a TEM photo of the styrene oligomer composite containing sodium sulfonate group and with nano Pd particles deposited on the surface thereof, as prepared in Example 6 of the present invention.

FIG. 4 shows a hydrophilic styrene oligomer composite containing sodium sulfonate group and with nano Pd particles deposited on the surface thereof, as prepared in this example.

Example 7

Preparation of Styrene-MMA Copolymer with Nano Metallic Particles Deposited on the Surface Thereof The steps in Example 6 were repeated except that a styrene-MMA copolymer prepared in Example 4 was used to replace the styrene oligomer containing sodium sulfonate group prepared in Example 3.

The invention claimed is:

1. A process for preparing a metal styrene polymer composite having nano metallic particles deposited on a surface thereof, which comprises the following steps:
   a) undergoing free radical polymerization of styrene and an optional co-monomer in the presence of a persulfate initiator and a chain transfer agent; and
   b) contacting the resulting styrene oligomer or copolymer of styrene and the co-monomer from step a) with an aqueous solution containing noble metal ions dissolved therein, so that the noble metal ions are reduced to element form particles and deposit on the styrene oligomer or copolymer of styrene and the co-monomer by sulfates on the oligomer or copolymer in the absence of a reducing agent.

2. The process as claimed in claim 1, wherein said persulfate initiator is alkali metal persulfate.

3. The process as claimed in claim 2, wherein said alkali metal persulfate is potassium persulfate.

4. The process as claimed in claim 1, wherein said chain transfer agent is tetrahalocarbon, 1-dodecyl sulfuric acid, 1-octyl sulfuric acid, or hydroquinone.

5. The process as claimed in claim 4, wherein said chain transfer agent is tetrahalocarbon.

6. The process as claimed in claim 5, wherein said tetrahalocarbon is tetrabromocarbon.

7. The process as claimed in claim 1, wherein said optional co-monomer is not used in Step a).

8. The process as claimed in claim 7, wherein the styrene oligomer obtained in Step a) has a number average molecular weight of 500-10,000.

9. The process as claimed in claim 1, wherein said aqueous solution containing noble metal ions in Step b) is an aqueous solution containing Au, Ag, Pd, Pt or Ru.

10. The process as claimed in claim 9, wherein said aqueous solution containing noble metal ions is an aqueous solution containing Pd ions.

11. The process as claimed in claim 1, wherein said contacting in Step b) is carried out at a temperature of 50-95° C.

12. The process as claimed in claim 1, wherein said optional co-monomer is used in Step a).

13. The process as claimed in claim 12, wherein said co-monomer is selected from the group consisting of acrylic acid, methacrylic acid, methyl acrylate, and methyl methacrylate.

* * * * *

UNITED STATES PATENT AND TRADEMARK OFFICE
CERTIFICATE OF CORRECTION

| | | |
|---|---|---|
| PATENT NO. | : 7,662,434 B2 | Page 1 of 1 |
| APPLICATION NO. | : 11/497308 | |
| DATED | : February 16, 2010 | |
| INVENTOR(S) | : Ou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this

Twenty-eighth Day of December, 2010

David J. Kappos
*Director of the United States Patent and Trademark Office*